United States Patent
Nakamura et al.

[11] Patent Number: 5,835,140
[45] Date of Patent: Nov. 10, 1998

[54] REMOTE-CONTROL METHOD AND APPARATUS FOR ROTATING IMAGE DEVICE

[75] Inventors: Hiroshi Nakamura, Kasuga; Yasuaki Muranaka, Fukuoka-ken, both of Japan

[73] Assignee: Matsushita Electric Industrial Co., Ltd., Osaka, Japan

[21] Appl. No.: 445,979

[22] Filed: Jun. 21, 1995

[30] Foreign Application Priority Data

Jun. 27, 1994 [JP] Japan .................................. 6-144686

[51] Int. Cl.⁶ .................................................. H04N 5/225
[52] U.S. Cl. ............................................. 348/211; 348/15
[58] Field of Search .................................. 348/211, 212, 348/13, 15; H04N 7/15, 5/232

[56] References Cited

U.S. PATENT DOCUMENTS

| | | | |
|---|---|---|---|
| 3,984,628 | 10/1976 | Sharp | 348/211 |
| 4,155,100 | 5/1979 | Hill, Jr. | 348/211 |
| 4,974,088 | 11/1990 | Sasaki | 358/210 |
| 5,444,476 | 8/1995 | Conway | 348/15 |
| 5,528,289 | 6/1996 | Cortjens et al. | 348/211 |

FOREIGN PATENT DOCUMENTS

| | | | |
|---|---|---|---|
| 06038087 | 2/1994 | Japan | H04N 5/232 |
| 06038203 | 2/1994 | Japan | H04N 7/15 |
| 9407327 | 3/1994 | WIPO . | |

OTHER PUBLICATIONS

Patent Abstracts of Japan, vol. 018, No. 308 (E–1560), 13 Jun. 1994, and JP–A–06 062401 (NEC Corp.; others: 01), 4 Mar. 1994.

Patent Abstracts of Japan, vol. 012, No. 211 (E–622), 16 Jun. 1988, and JP–A–63 009287 (Fujitsu Ltd.), 14 Jan. 1988.

"Robotic Cameras: The News Of The Future," Goldsmith, et al., *International Broadcasting Convention*, pp. 148–151, 1988.

*Primary Examiner*—Wendy Garber
*Attorney, Agent, or Firm*—Stevens, Davis, Miller & Mosher, L.L.P.

[57] ABSTRACT

A method of remotely controlling the direction of a camera which is rotatively supported by a remote control device. Several remote control devices are coupled by a communication line. The communication line is used both for transmitting image information and for transmitting instruction information. An input instruction can be input to a first remote control device directly at the first side or transmitted through the communication line from a second remote side. The camera is rotated at a one speed if the instruction is received directly from the first side, or at a second, slower speed if the instruction is transmitted through the communication line from the second remote side.

7 Claims, 14 Drawing Sheets

REMOTE-CONTROL METHOD AND APPARATUS FOR ROTATING IMAGE DEVICE

BACKGROUND OF THE INVENTION

1. Field of the Invention

The present invention relates to a TV conference apparatus or a remote supervisory control apparatus which is connected to a remotely located same apparatus through a communication network when it is used, and more particularly, to a remote-control method and device for a camera which are used to direct the camera to any desired direction.

2. Description of the Related Art

Today, as high-speed digital communication network service is in progress, the standards on coding or decoding a moving picture or speech have been unified more and more. In light of this kind of background, a TV conference apparatus or a remote supervisory control apparatus arranged to use a dynamic-image communication technique is now prevailing.

Later, the description will be oriented to a remote-control device for a camera used for such a TV conference apparatus with reference to the drawings. In the following description, the camera remote-control device is mounted to each of the TV conference apparatuses connected through a communication network. In actual use, the TV conference apparatuses operate to communicate with each other, so that no master-slave relation exists among these apparatuses. In the description, however, for the explanation's sake, the TV conference apparatus (including the camera remote-control device) currently handled by an operator is generically abbreviated as the apparatus of the calling side. Likewise, all the TV conference apparatuses (TV conference member) connected to the apparatus of the calling side as viewed from that operator are generically abbreviated as the apparatus of the other side.

FIG. 14 is a block diagram showing a conventional remote-control device for a camera. In FIG. 14, a numeral 23 denotes a communication network connected between the camera remote-control device of the calling side and the camera remote-control device of the other side. A numeral 24 denotes a communication device for doing communication through the network 23. A numeral 24a denotes a keyboard on which data such as instructions are entered.

A numeral 25 denotes a camera device, which operates to pick up an image as panning or tilting the camera itself in response to signals indicating instructions sent out of the communication device 24.

Camera device 25 is arranged as follows. In the block representing the device 25, a numeral 26 denotes a control circuit, which includes a microprocessor unit (abbreviated as MPU and not shown in the figure) and operates to output a pulse train for controlling the operation of the camera device 25. A numeral 27 denotes a first pulse motor, which operates to tilt a lens 31 (to be discussed below) in response to the pulse train sent from the control circuit 26. A numeral 28 denotes a second pulse motor, which also operates to pan the lens 31 like the first pulse motor 27.

A numeral 29 denotes a first supporter, which holds an imaging device (not shown) therein and keeps the device vertically movable. FIG. 14 represents the state in which the imaging device is held in the first supporter and the lens 31 is exposed from the first supporter. A numeral 30 denotes a second supporter which keeps the lens 31 horizontally movable.

The conventional camera remote-control device arranged as described above operates as follows. FIG. 15A shows an exciting pulse train outputted by the control circuit 26 when the camera device provided in the conventional camera remote-control device is panned or tilted. FIG. 15B shows an angular speed given when the camera device is panned or tilted by the exciting pulse train shown in FIG. 15A.

At first, the description will be oriented to the tilting operation of the camera device 25 provided in the calling side. At first, by using a keyboard 24a, a command signal indicating the start of the tilting operation is outputted to the control circuit 26 provided in the camera device 25. Next, in response to the start command signal, the control circuit 26 operates to output an exciting pulse train having a fixed cycle $t_0$ as shown in FIG. 15A to the first pulse motor 27. During an interval of T when the exciting pulse train is being outputted, the first pulse motor 27 keeps the driving state at a constant angular speed $\omega_0$. In this state, the first supporter 29 is vertically moved at a constant angular speed $\omega_0$ so that the image is picked up as keeping the lens 31 vertically tilted. The image picked up by the lens 31 is displayed on a display unit 32 or is coded by the communication device 24 provided in the calling side and then is transmitted to the other side through communication network 23. Then, the image is displayed on the display unit (not shown) of the other side.

Next, a command signal indicating the tilt stoppage is outputted to the control circuit 26 of the camera device 25 through the keyboard 24a. Next, in response to the tilt stoppage command signal, the control circuit 26 operates to stop the output of the exciting pulse train.

Likewise, in order to keep the lens 31 panned, a command signal indicating the start of the panning is outputted to the control circuit 26 of the camera device 25 provided in the calling side through the keyboard 24a of this side. In response to this signal, the second pulse motor 28 is driven at a constant speed, so that the second supporter 30 is horizontally moved at a constant angular speed $\omega_0$. The horizontal action of the second supporter 30 allows the lens 31 to be panned when picking up an image.

On the other hand, to tilt the camera device 25 of the calling side by handling the keyboard (not shown) of the other side, at first, the inputted command signal is coded by the communication device (not shown) of the other side and then is sent out through the communication line 23. The communication device 24 of the calling side operates to decode the received command signal and then output it to the control circuit 26. Like the calling side, the control circuit 26 operates to tilt the lens 31 in response to the received command signal.

Next, the image picked up by the lens 31 is displayed on the display unit 32 of the calling side or is sent to the communication device (not shown) of the other side through the communication line 23. When sending out the image to the communication device of the other side, the video signal is temporarily coded in the communication device 24 of the calling side and is transmitted to the communication device (not shown) of the other side through the communication line 23. Then, the coded video signal is decoded in the communication device (not shown) of the other side. The decoded video signal is displayed on the display unit (not shown) of the other side.

Likewise, in the panning operation, through the use of the keyboard (not shown) of the other side, the command signal indicating the start of the panning is outputted to the control circuit 26 provided in the camera device 25 of the calling side. In response to the command signal, the second pulse motor 28 is driven at a constant speed so that the second supporter 30 is horizontally moved at a constant angular speed $\omega_0$. The horizontal action of the supporter 30 allows the lens 31 to be panned when picking up an image.

However, the foregoing conventional arrangement inevitably needs more time for handling the camera device of the other side than for handling the camera device of the calling side by an image processing time required for the coding and decoding process and a transmission delay time for transmitting an image signal through the communication line. Consequently, there is generated a time lag corresponding to a sum of the image processing time and the transmission delay time between the actually picked image and the displayed image. (Hereinafter, this sum is called as a processing delay time.)

This results in the following adverse effect on the operation. For example, consider that as the other side is viewing its own display unit, the keyboard is operated for outputting a stop command signal when a target object is displayed in the center of the screen. However, the actual picked-up image (that is, the direction of the camera device of the calling side) has been already rotated by the processing delay time. Hence, when the camera device is actually stopped, the image displayed on the display unit of the other side has a target object passed over the center of the screen.

As such, the conventional arrangement has a shortcoming that an operator is required to consider a time lag between the picked image and the displayed image by the processing delay time.

Further, when the camera device is tilted or panned, if the direction of the camera device for imaging is too much off the target object, the panning or tilting speed is too low for the camera device to smoothly display the target object on any point of the screen, because the angular rotating speed is made constant. Or, when fine adjusting the location of the target object displayed on any point of the screen to any desired point, the panning or tilting speed is so fast that the target object is passed over the desired point of the screen. This hence needs several corrections. As such, the conventional arrangement is disadvantageous in the physical operativity of the camera device.

SUMMARY OF THE INVENTION

The present invention is provided for solving the foregoing disadvantages of the conventional arrangement. It is an object of the present invention to provide a camera remote-control device which is superior in operativity and operates a camera to display a desired object on a desired location without having to consider the adverse effect given by the processing delay time or correct the image location when the camera remote-control device is panned or tilted.

A remote-control device for a camera according to the present invention includes a communication line, connected to a communication network, for communicating between at least a first side and a second side, a communication device having an input unit for inputting operating instructions and data for the overall remote-control device for a camera and a coding and decoding unit for controlling connection and disconnection of the communication line, coding a signal to be sent to the communication line, and decoding a received signal, a display unit for displaying a received or picked image, a control unit for controlling the overall remote-control device for a camera in response to the operating instructions, a driving unit controlled by a pulse train issued from the control unit, and an imaging unit for picking up an image as keeping the camera panned or tilted by the driving unit, said control unit having control means for issuing a short-cycle exciting pulse train when the imaging unit of the first side is handled by the first side and issuing a long-cycle exciting pulse train when the imaging unit of the first side is handled by the second side, start control means for issuing a constant long-cycle exciting pulse train for a initial starting fixed interval when the panning or tilting of the camera device is started, shortening the cycle more and more after the initial start fixed interval is passed, and outputting a constant short-cycle exciting pulse train, stop control means for outputting an exciting pulse train for panning or tilting the camera device in the direction opposite to the start for a predetermined interval after the panning or tilting of the camera device is stopped, and communication control means for setting the period in which the exciting pulse train is outputted by the stop control means in accordance with to the delay time of the process.

The foregoing arrangement allows the camera device or the imaging unit to be panned or tilted at an angular rotating speed suited to each operator. The camera remote-control device according to the foregoing arrangement can be operated from the calling side or the other side without worring the time lag of the processing delay time and is superior in operativity.

Further, the camera device is rotated at a slow speed suited to fine adjustment of an object location on the display screen at the initial interval when the camera device is panned or tilted. After the initial interval, the rotating speed is gradually increased and reaches the proper value to coarse adjustment of the object location.

Moreover, the remote-control device for a camera according to this arrangement operates to correct a rotating angle passed from the stopped location for the target object and stop the camera device nearby the target stopped location. This does not need to reset the direction of the camera device or restart the operation.

Hence, the remote-control device for a camera according to the present invention is superior in operativity.

DESCRIPTION OF THE PREFERRED EMBODIMENTS

Figure 1:
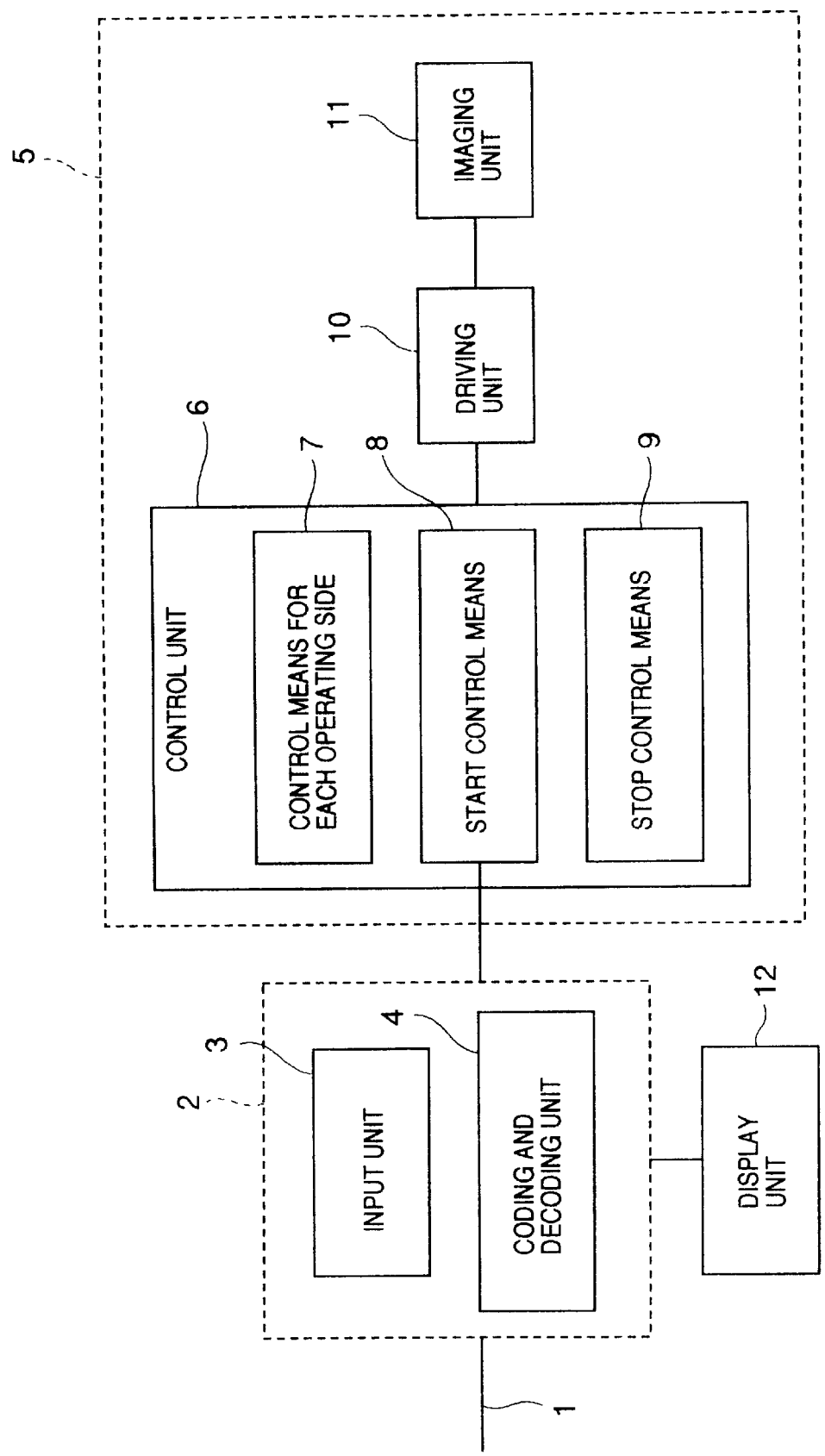
FIG. 1 is a function block diagram showing a remote-control device for a camera according to an embodiment of the present invention.

With reference to the drawings, the description will be oriented to a remote-control device for a camera according to an embodiment of the present invention. FIG. 1 is a function block diagram showing the remote-control device for a camera (called a camera remote-control device). In FIG. 1, a numeral 1 denotes a communication line which connects a communication network with a TV conference system provided with the camera remote-control device. A numeral 2 denotes a communication device which operates to send or receive a video signal or enter operating instructions. A numeral 3 denotes an input unit. The input unit 3 is included in the communication device 2 and is used for entering at a such as instructions for the overall camera remote-control device. A numeral 4 denotes a coding and decoding unit which operates to code a signal to be sent or decode a received signal.

A numeral 5 denotes a camera device which receives a signal indicating an operating instruction sent from the communication device 2 and operates to pan or tilt a camera for imaging a target object. A numeral 6 denotes a control unit which operates to control the overall camera device 5 in response to the instruction issued from the input unit 3 on the calling side or the other side.

A numeral 7 denotes control means for each operating side which operates to output a short-cycle exciting pulse train when the camera device 5 of the calling side is operated in response to the instruction inputted by the input unit 3 of the calling side or a long-cycle exciting pulse train when the camera device 5 of the calling side is operated in response to the instruction inputted by the input unit 3 of the other side.

A numeral 8 denotes a start control means. The start control means 8 operates, in response to the instruction inputted by the input unit 3, to output a fixed-cycle exciting pulse train, which keeps a longer interval between the adjacent pulses, at the initial start interval when the camera device 5 is started. Then, after the initial interval is passed, the start control means 8 operates to output a fixed-cycle exciting pulse train, which shortens the cycle between the adjacent pulses more and more as the time is passing. After the certain interval is passed, the start control means 8 operates to output a fixed-cycle exciting pulse train that keeps a short interval between the adjacent pulses.

A numeral 9 denotes a stop control means. When the camera device 5 is panned or tilted in response to an instruction inputted by the input unit 3 of the other side, the stop control means 9 operates to output an exciting pulse train for a predetermined period. The exciting pulse train indicates the reverse panning or tilting opposite to that direction at the start time.

A numeral 10 denotes a driving unit which operates to drive a motor in response to the exciting pulse train issued from the control unit 6. A numeral 11 denotes an imaging unit which operates a camera to pick up an image as panning or tilting the camera by means of the driving unit 10. A numeral 12 denotes a display unit which displays an image picked by the imaging unit 11 or an image received from the communication line 1.

Figure 2:
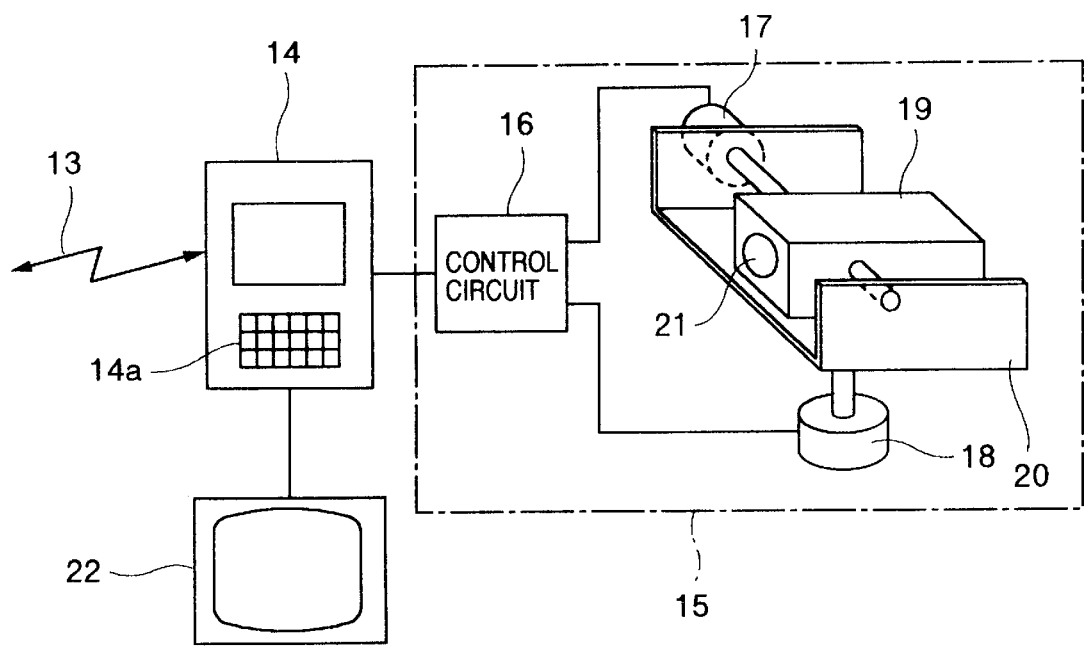
FIG. 2 is a diagram showing a remote-control device for a camera according to the embodiment of the present invention.

FIG. 2 is a diagram showing a camera remote-control device according to an embodiment of the present invention. In FIG. 2, a numeral 13 denotes a communication line which corresponds to the communication line 1 of FIG. 1. A numeral 14 denotes a communication device which corresponds to the communication device 2 of FIG. 1. A numeral 14a denotes a keyboard which corresponds to the input unit 3 of FIG. 1.

A numeral 15 denotes a camera device which corresponds to the camera device 5 of FIG. 1. A numeral 16 denotes a control circuit which corresponds to the control unit 6 of FIG. 1. A numeral 17 denotes a first pulse motor for tilting the camera, which motor composes a part of the driving unit 10 of FIG. 1. A numeral 18 denotes a second pulse motor for panning the camera, which motor composes a part of the driving unit 10 of FIG. 1.

Figure 14:
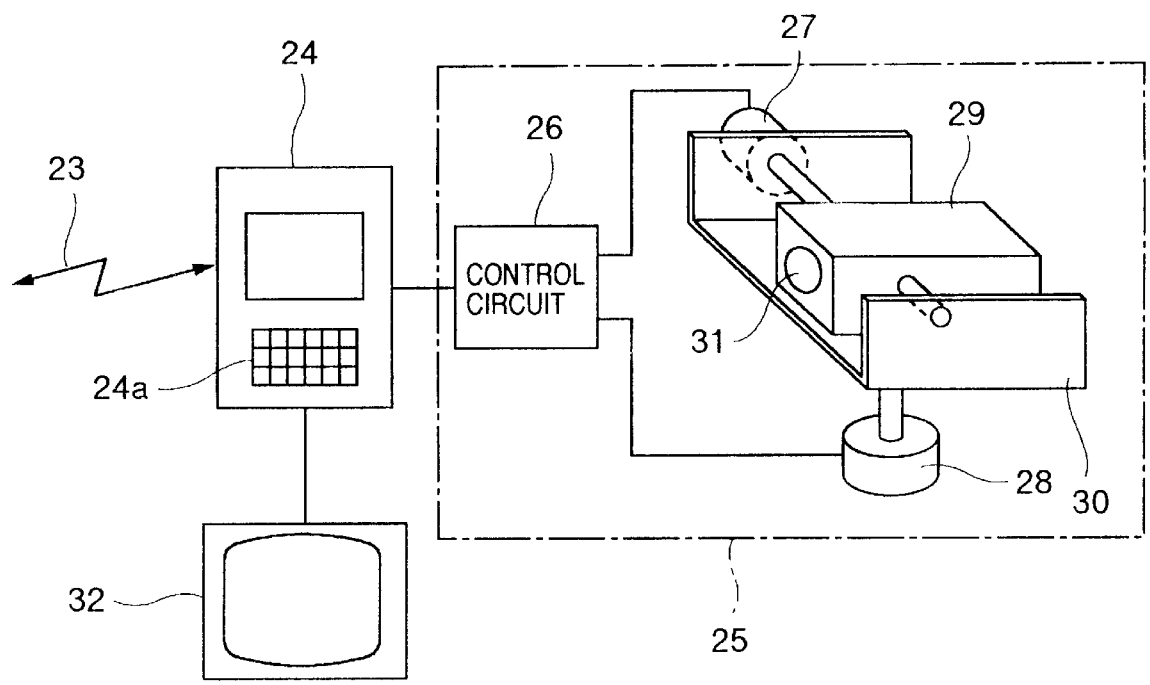
FIG. 14 is a block diagram showing a conventional remote-control device for a camera.
Figures 15A, 15B:
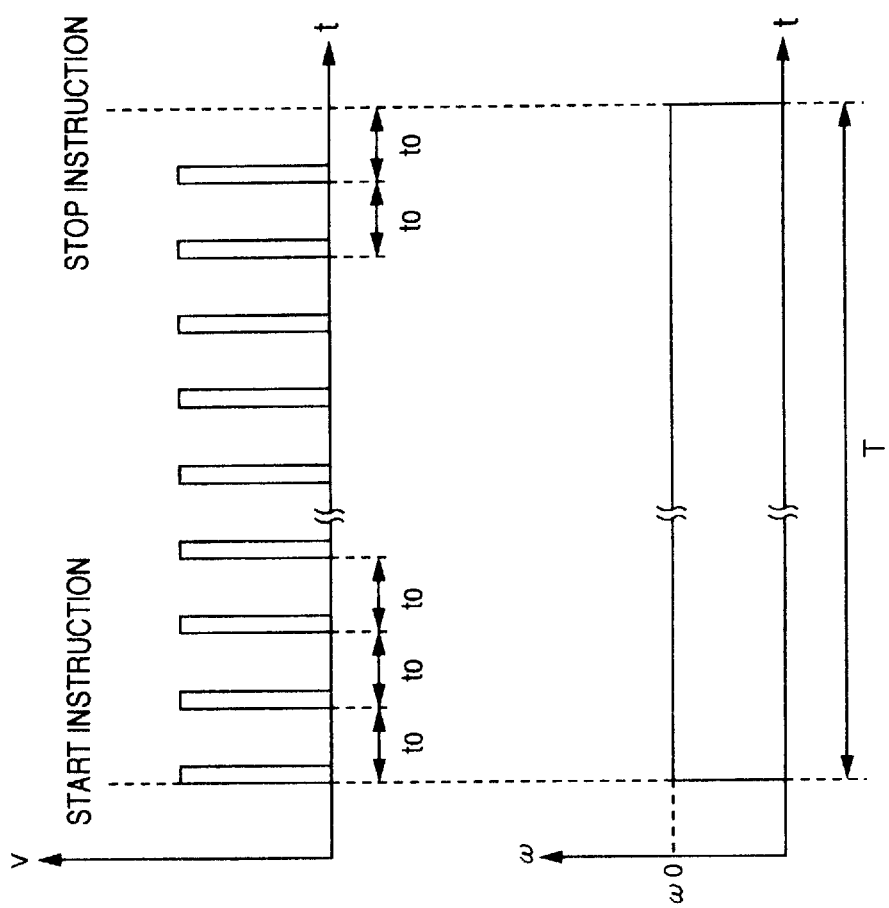
FIG. 15A is a view showing an exciting pulse train issued by a control circuit for panning or tilting the camera device in the conventional remote-control device for a camera.
FIG. 15B is a view showing an angular speed appearing when the camera device is panned or tilted in response to the exciting pulse train shown in FIG. 15A.

A numeral 19 denotes a first supporter which corresponds to the first supporter 29 of FIG. 14. A numeral 20 denotes a second supporter which corresponds to the second supporter 30 of FIG. 14. A numeral 21 denotes a lens which composes the imaging unit 11 of FIG. 1. This lens corresponds to the lens 31 of FIG. 14. A numeral 22 denotes a display unit which composes the display unit 12 of FIG. 1. The display unit 22 corresponds to the display unit 32 of FIG. 14. These components are the same as those of the conventional apparatus for the most part and thus are not described herein for the purpose of avoiding double descriptions.

Figure 3:
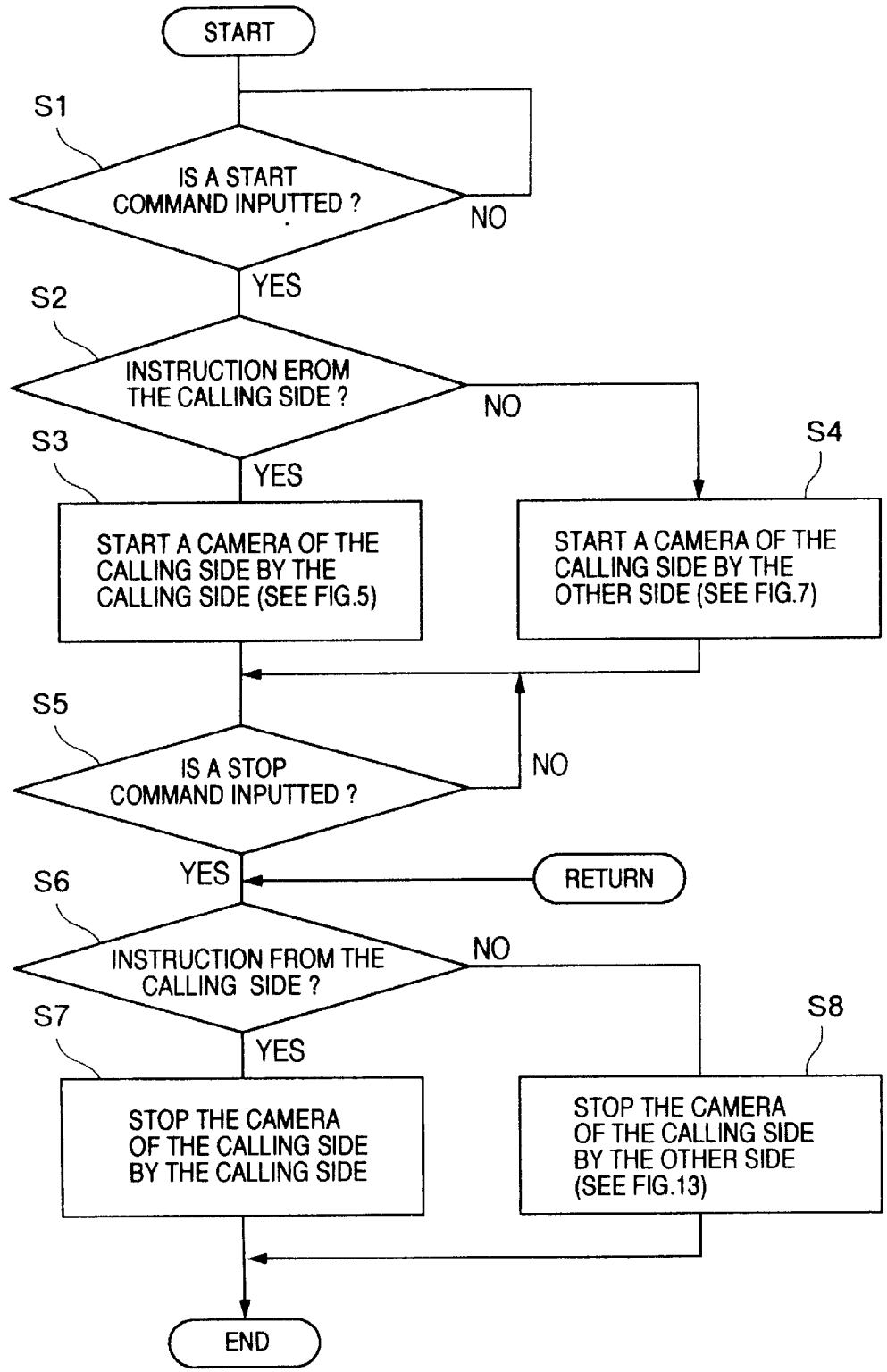
FIG. 3 is a flowchart showing a control unit included in the remote-control device for a camera according to the embodiment of the present invention.
Figure 4:
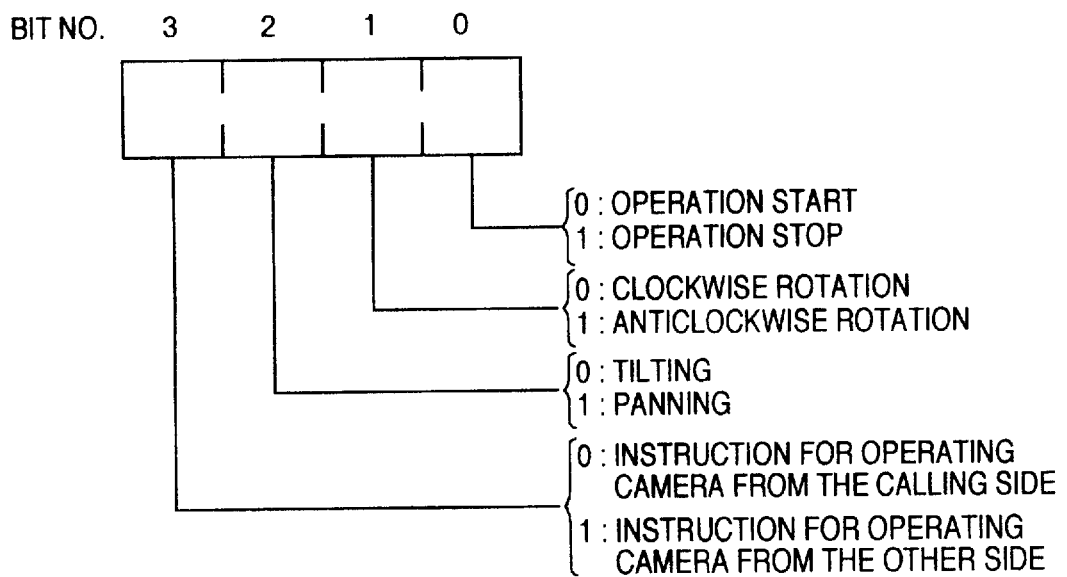
FIG. 4 is a view showing a structure of an instruction signal outputted to the control unit by a communication device provided in the remote-control device for a camera according to the embodiment of the present invention.
Figure 5:
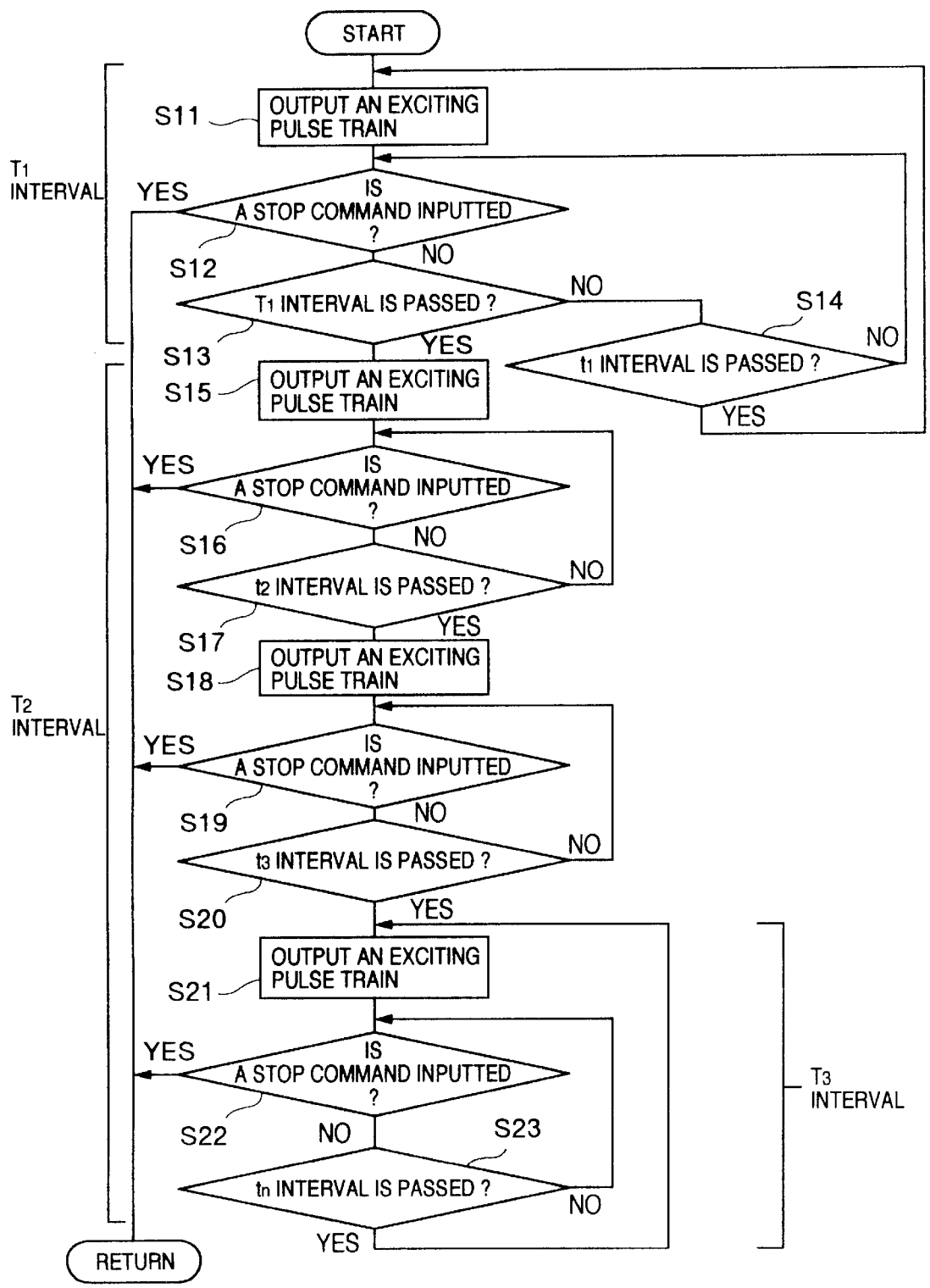
FIG. 5 is a flowchart showing a subroutine used for a step 3 of FIG. 3.
Figures 6A, 6B:
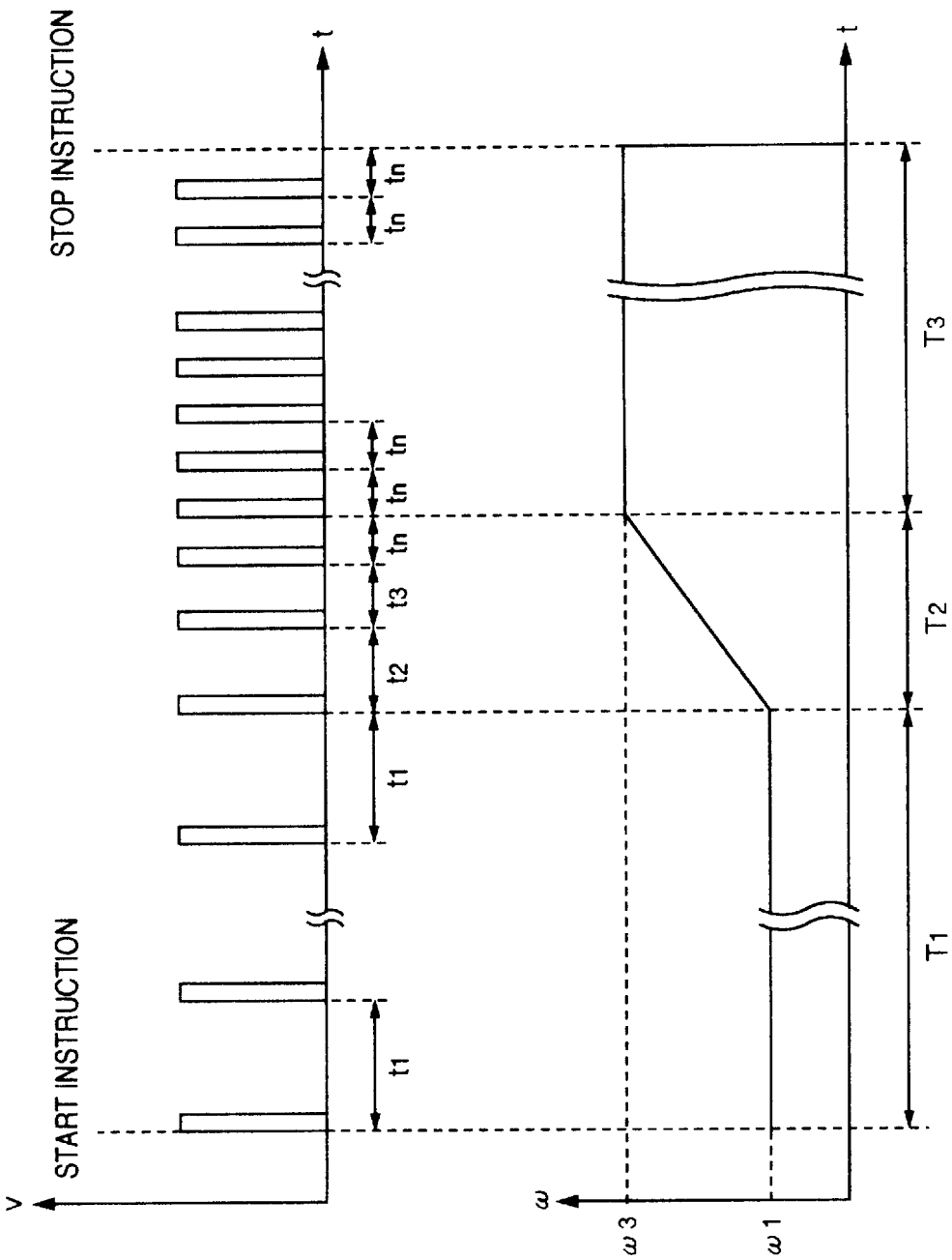
FIG. 6A is a view showing an output pulse train issued when a camera device is started from an input unit provided on the calling side.
FIG. 6B is a view showing an angular speed of the camera device shown in FIG. 6A.
Figure 7:
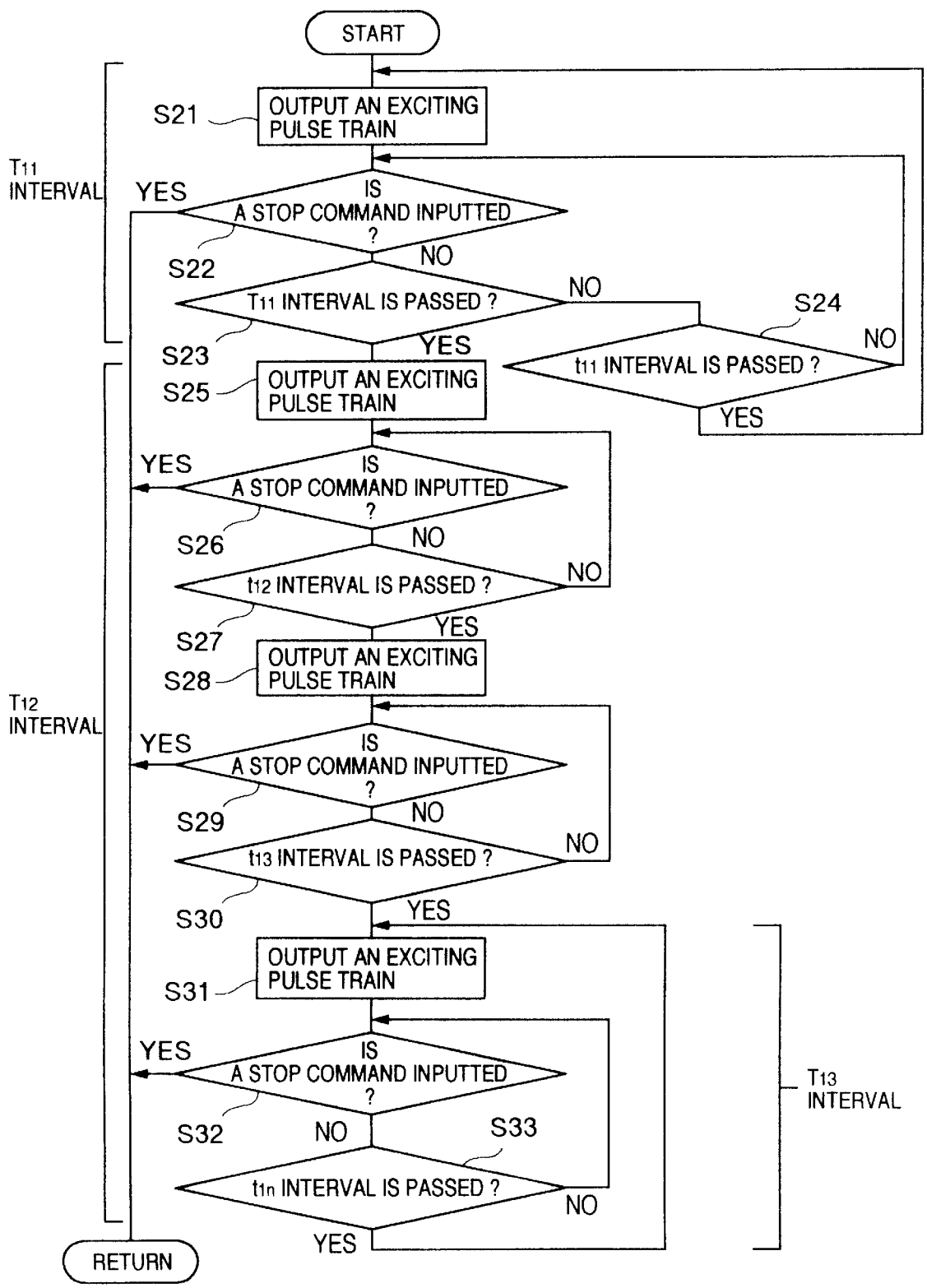
FIG. 7 is a flowchart showing a subroutine used for the step 4 of FIG. 3.
Figures 8A, 8B:
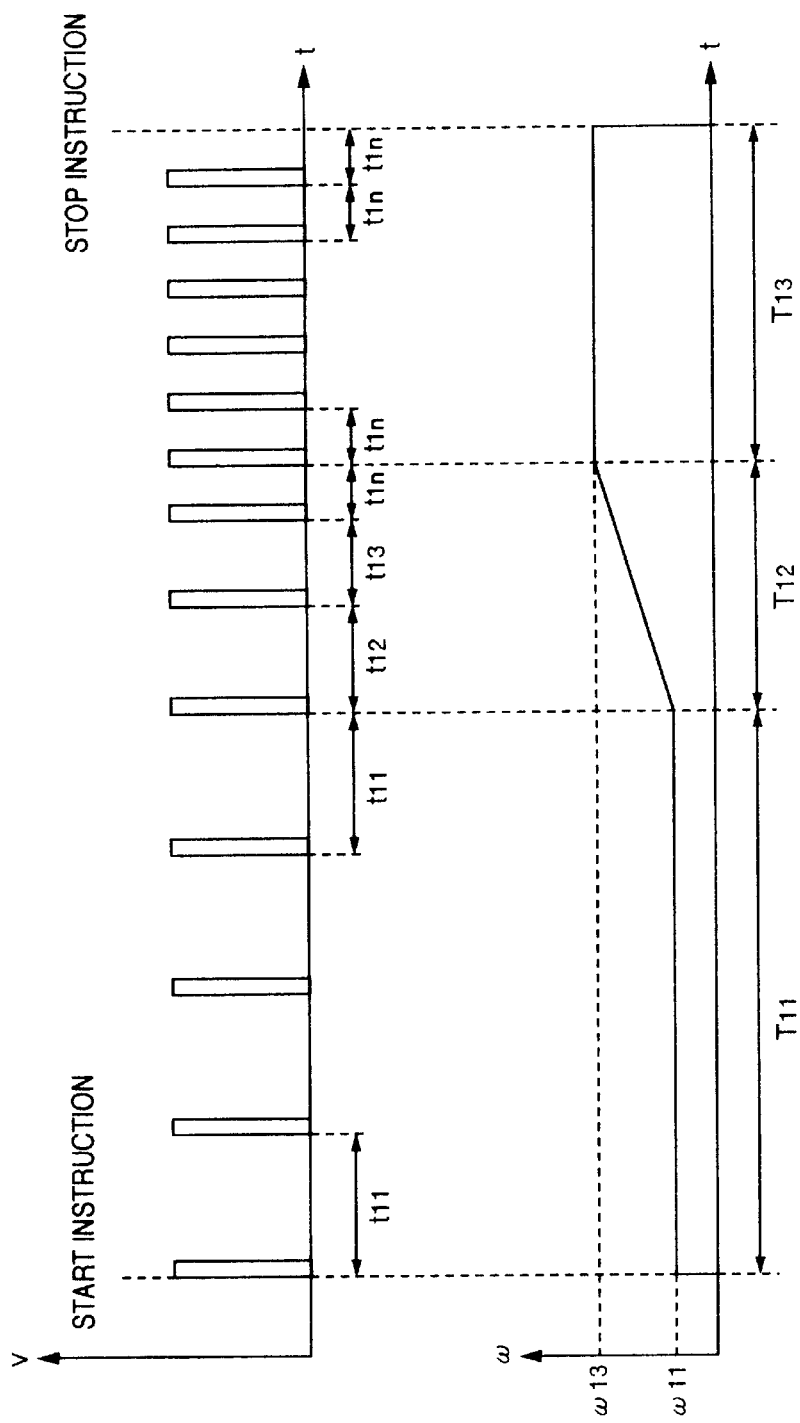
FIG. 8A is a view showing an output pulse train issued when the camera device of the calling side is started from an input unit provided on the other side.
FIG. 8B is a view showing an angular speed of the camera device shown in FIG. 8A.
Figure 9:
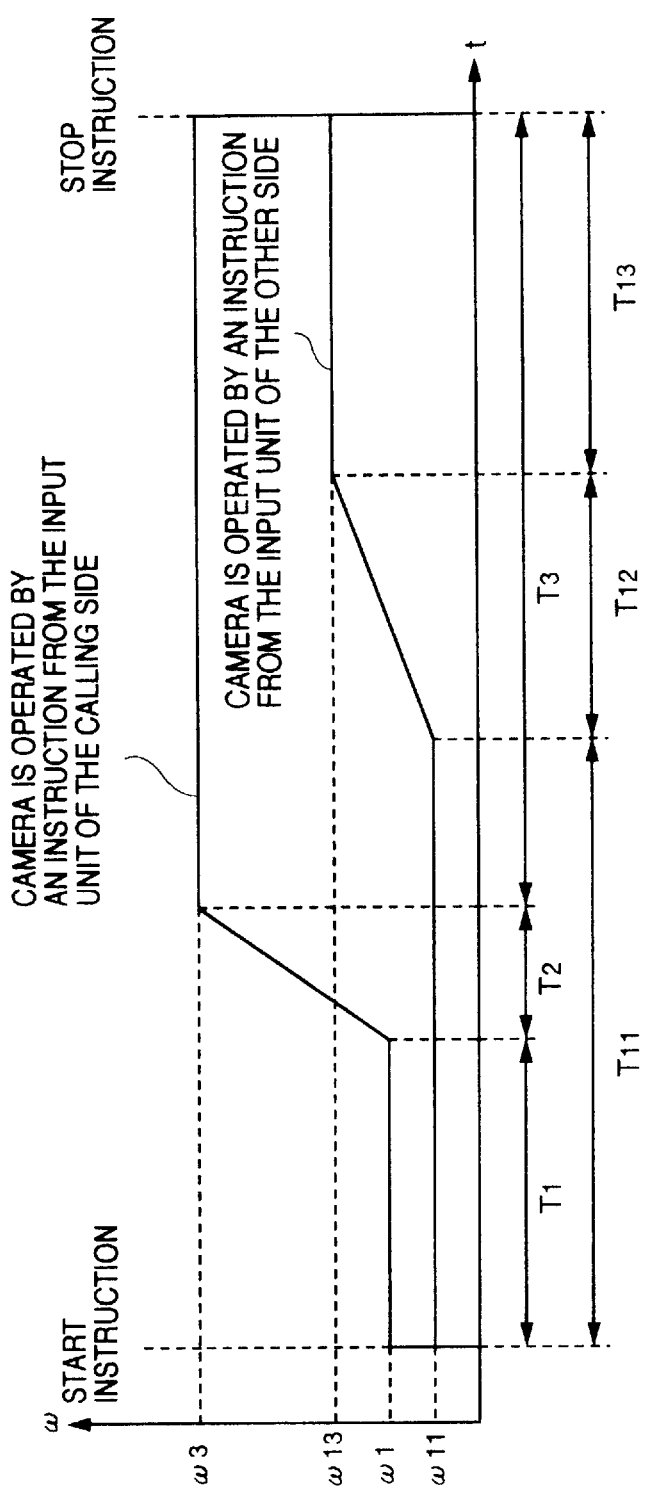
FIG. 9 is a chart showing a comparison between an angular speed of FIG. 6B and that of FIG. 8B.

Then, the description will be oriented to the operation of the camera remote-control device arranged as described above with reference to the drawings. FIG. 3 is a flowchart showing the overall operation of the control unit provided in the camera remote-control device. FIG. 4 shows a structure of an instruction signal issued to the control unit by the communication device provided in the camera remote-control device. FIG. 5 is a flowchart showing a subroutine executed at the step 3 of FIG. 3. FIG. 7 is a flowchart showing a subroutine executed at the step 4 of FIG. 3. FIG. 6A shows an output pulse train issued when the camera device is started by operating the input unit of the calling side. FIG. 6B shows an angular speed of the camera device appearing in the state of FIG. 6A. FIG. 8A shows an output pulse train issued when the camera device is started from the input unit of the other side. FIG. 8B shows an angular speed of the camera device appearing in the state of FIG. 8A. FIG. 9 is a chart showing a comparison of an angular speed between FIG. 6B and FIG. 8B.

At first, as shown in FIGS. 3 and 4, when the control unit 6 receives an instruction signal from the communication device 2, the control unit 6 operates to analyze the structure of the received signal and determine whether or not an instruction signal for starting the operation is inputted according to the information of the bit no. 0 (step 1). If no, the instruction signal is awaited again.

If yes, the start control means 8 is started. Then, the operation goes to a step 2, at which it is determined whether the instruction signal is issued from the calling or the other side in accordance with the information of the bit no. 3. Then, based on the determination, the control means for each operating side 7 is started (step 2). If it is from the calling side, the operation goes to a step 3, at which the camera device is started on the calling side (S3). If it is from the other side, the operation goes to a step 4, at which the camera device is started on the other side (S4).

Next, the operation is executed to wait for an instruction signal after the start control is done. It is determined whether or not the instruction signal for stopping the operation is inputted in accordance with the information of the bit no. 0 (S5). If no, the stopping instruction is awaited. If yes, the operation goes to a step 6, at which the camera is controlled to be stopped.

In addition, at the steps 3 and 4, the instruction signal contains a specification of tilting or panning and a direction of rotation. The specification is not a gist of the present invention and may be executed by the similar technique to the foregoing determination about which of the stop or the start of the driving unit. Hence, the description thereabout is not described herein.

Next, the description will be oriented to the detail of the starting operation of the camera provided on the calling side at the step 3 of FIG. 3 with reference to FIGS. 5 and 6. At first, it is assumed that the instruction for the camera provided on the calling side is determined to indicate a clockwise tilting operation as a result of analyzing the instruction signal shown in FIG. 4. When the operation goes to the step 3 shown in FIG. 3, the subroutine shown in FIG. 5 for starting the camera provided on the calling side is started.

Then, the control means 7 for each operating side operates to select the exciting pulse train for the instruction given from the calling side and output the exciting pulse train to the first pulse motor 17 at first under the control of the start control means 8. In response, the first pulse motor 17 starts to tilt the first supporter 19 (S11). It is determined whether or not the instruction signal for stopping the camera is inputted (S12). If yes, the operation immediately goes out of the starting subroutine and jumps to the step 6. If no, it is determined whether or not the interval $T_1$ is passed (S13). The interval $T_1$ is requisite to making sure of the current location (direction) of the camera device. If no, the operation goes to a step 14, while if yes, the operation goes to a step 15.

At the step 14, it is determined whether or not a period of $t_1$ is passed (S14). If yes, the operation jumps to the step 11 at which the output of the exciting pulse train is continued. If no, the operation jumps to the step 12 and the output of the exciting pulses are discontinued. During the interval $T_1$, therefore, the exciting pulses are outputted to the first pulse motor 17 at a period $t_1$ for keeping the first supporter 19 tilted. With the supporter 19 being tilted, the current location (direction) of the camera device 15 is confirmed.

Next, if step 13 indicates yes, the operation is executed to output the exciting pulse train (S15) and monitor the input of the stopping instruction (S16). If yes, the operation immediately goes out of the starting subroutine and jumps to the step 6. If no, it is determined whether or not a period of $t_2$ is passed (S17). If no, the operation jumps to the step 16.

Next, if step 17 indicates yes, the operation is executed to output the exciting pulse train (S18) and monitor the input of the stopping instruction (S19). If yes, the operation immediately goes out of the starting subroutine and jumps to the step 6. If no, it is determined whether or not a period of $t_3$ is passed (S20). If no, the operation goes to a step 19.

Under the control of the start control means 8, the passing interval (that is, pulse interval) is made gradually shorter. This control is repetitively executed so that the pulse interval is reduced to a period of $t_n$ (S23). In FIG. 6, during the period of $T_2$ when the pulse interval is reduced, the first pulse motor 17 is under acceleration. Hence, the angular speed is increased from $\omega_1$ at the start time to $\omega_3$ after the $T_2$ period or more.

Unless the stopping instruction is inputted (S22), the operation from the steps 21 to 23 is repetitively executed until reaching to the period $T_3$ in which the first pulse motor 17 is driven at the cycle of $t_n$.

Further, the detail of the starting operation of the camera provided on the calling side by instruction of the other side, which is executed at the step 4 of FIG. 3, will be described with reference to FIGS. 7 and 8. At first, it is assumed that the instruction for the camera provided on the other side is determined to indicate a clockwise tilting operation as a result of analyzing the instruction signal shown in FIG. 4. When the operation goes to the step 4 of FIG. 3, the subroutine shown in FIG. 7 is started. This subroutine is executed for starting the camera provided on the calling side by the instruction of the other side.

Then, the control means 7 for each operating side operates to select the exciting pulse train for the instruction given from the other side and output the exciting pulse train to the first pulse motor 17 at first under the control of the start control means 8. In response, the first pulse motor 17 starts to tilt the first supporter 19 (S21). It is determined whether or not the instruction signal for stopping the camera is inputted (S22). If yes, the operation immediately goes out of the starting subroutine and jumps to the step 6. If no, it is determined whether or not the interval $T_{11}$ is passed (S23). The interval $T_{11}$ is requisite to making sure of the current location (direction) of the camera device 15. If no, the operation goes to a step 24, while if yes, the operation goes to a step 25.

At the step 24, it is determined whether or not the period $t_{11}$ is passed again (S24). If yes, the operation goes to the step 21, at which the exciting pulse train is continued. If no, the operation goes to the step 22 and the output of the exciting pulses are discontinued. During the interval $T_{11}$, the exciting pulse train is outputted to the first pulse motor 17 at the period $t_{11}$ and the current location (direction) of the camera device 15 is confirmed as keeping the first supporter 19 tilted.

Next, if step 23 indicates yes, the operation is executed to output the exciting pulse train (S25) and monitor the input of the stopping instruction (S26). If yes, the operation immediately goes out of the starting subroutine and jumps to the step 6. If no, it is determined whether or not a period $t_{12}$ is passed (S27). If no, the operation jumps to the step 26.

Next, if step 27 indicates yes, the operation is executed to output the exciting pulse train (S28) and monitor the input of the stopping instruction (S29). If yes, the operation immediately goes out of the starting subroutine and jumps to the step 6. If no, it is determined whether or not a period $t_{13}$ is passed (S30). If no, the operation jumps to the step 29.

Under the control of the start control means 8, the passing interval (that is, pulse interval) is made gradually shorter. This control is repetitively executed so that the pulse interval is reduced to a period of $t_{1n}$ (S23). In FIG. 8, during the period $T_{12}$ when the pulse interval is reduced, the first pulse motor 17 is under acceleration. Hence, the angular speed is increased from $\omega_{11}$ at the start time to $\omega_{13}$ after the period $T_{12}$ or more.

Unless the stopping instruction is inputted (S32), the operation from the steps 31 to 33 is repetitively executed until reaching to the period $T_{13}$ in which the first pulse motor 17 is driven at the cycle of $t_{1n}$.

The foregoing description about the control means 7 for each operating side has been explained on the embodiment where the rotating speed of the camera device is changed by the cycle of the exciting pulse train in accordance with whether the instruction is made by calling side or the other side. This is because the motor used in this embodiment is a stepping motor that is convenient to the control operation. In addition to the factor for the speed change used in this embodiment, it is possible to select another factor such as a motor frequency, a motor voltage, a reduction gear ratio and so on. The arrangement based on another factor may offer the same effect as that of this embodiment. Hence, the description thereabout is left out.

Further, with reference to FIGS. 6, 8 and 9, the difference between the steps 3 and 4 will be discussed. The operation by the calling side shown in FIG. 6 needs a shorter cycle, at which the pulse is outputted, than the operation from the other side shown in FIG. 8. As a result, the slower angular speed is set to the operation from the other side as indicated by a comparison of an angular speed between $\omega_1$ and $\omega_{11}$ or $\omega_3$ and $\omega_{13}$ of FIG. 9.

Likewise, as indicated by a ratio of $T_1$ to $T_{11}$, a longer starting interval is set to the operation from the other side. Each difference appears because the operator on the other side performs the necessary operation as watching the monitor and thus needs a slower action for a better availability.

Next, the description will be oriented to how the camera stopping operation is controlled at the step 6 or later of FIG. 3. Like the starting time, the control unit 6 receives an instruction signal from the communication device 2, analyzes a signal structure and determines whether the calling side or the other side performs the operation according to the information of the bit no. 3 of FIG. 4 (S6). If yes, the operation goes to the step 7 at which the camera provided on the calling side is controlled to be stopped by the calling side. If no, the operation goes to the step 8, at which the stop control means 9 is started for stopping the camera of the calling side by the other side (S8).

In the control for stopping the camera of the calling side, executed at the step 7, by immediately stopping the output of the driving pulse train, the rotation of the camera device is stopped. In addition, it is also possible to gradually reduce the driving pulse train to zero for absorbing the inertia of the camera device appearing when the camera is stopped.

Next, at the step 8, the control for stopping the camera of the calling side by the other side is executed. The description will be oriented to an image delay time that is peculiar to image communication executed by a TV conference apparatus containing the camera remote-control device, for example.

Figure 10:
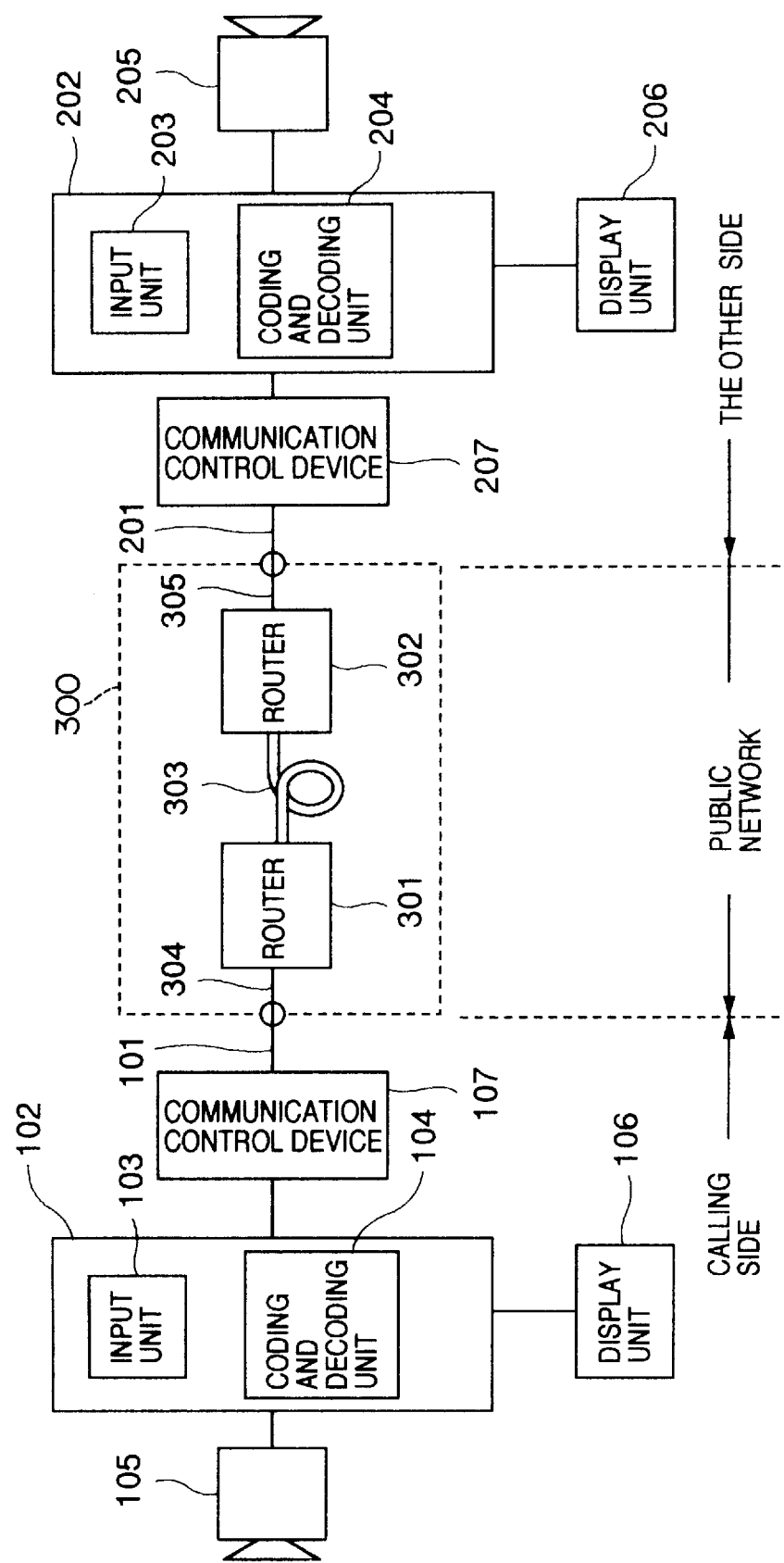
FIG. 10 is a block diagram showing a communication system of TV conference apparatuses each including a remote-control device for a camera.

FIG. 10 is a block diagram showing a system configuration of TV conference apparatuses each having a camera remote-control device. In FIG. 10, numerals 101 and 201 denote a communication line which is connected to a TV conference system containing the camera remote-control device through a communication network. Numerals 102 and 202 denote communication devices which operate to send and receive a video signal or is used for entering an operating instruction through the communication line 101 or 201. Numerals 103 and 203 denote input units which are included in the communication devices 102 and 202, respectively. Through the input units, an operator enters data such as an operating instruction to the camera remote-control device. Numerals 104 and 204 denote coding and decoding units which operate to code a signal to be sent and decode a received signal. Numerals 105 and 205 denote camera devices which receive signals such as an operating instruction sent from the communication devices 102 and 202 and pans and tilts the camera for picking up a target image. Numerals 106 and 206 denote display units which are included in the communication devices 102 and 202, respectively. The display units operate to monitor the camera devices 105 and 205 or indicate the operation guides. Numeral 107 and 207 denote communication control devices which operate to take an interface with the communication line 101 or 201 and control the connection between the communication line 101 and the communication devices 102 and 202.

A numeral 300 denotes a public network which is roughly divided into a large-capacitance trunk 303 like an optical fiber connecting big cities with each other and small-capacitance lines 304 and 305. Numerals 301 and 302 denote collector/distributor units called routers which are connected between the trunk 303 and the lines 304 and 305.

In the communication system arranged as described above, it is assumed that the camera device 205 of the other side is controlled to be stopped by operating the input unit 103 provided on the calling side. An operating signal issued from the input unit 103 provided on the calling side is immediately transmitted as a control signal to the camera device 205 through the communication control device 107 and the public network 300.

On the other hand, the display content of the display unit 106, on which the operator of the calling side operates the camera, is imaged by the camera device 205, coded by the coding and decoding unit 204, and decoded by the coding and decoding unit 104. In actual, an additional processing time is required for coding a video signal by the unit 204 and decoding a coded signal by the unit 104.

The times required for these coding and decoding processes (represented as $t_{a1}$ and $t_{a2}$, respectviely) is generally called frame rates. The time lengths required for coding and decoding the signal are dependent on the settings of the coding and decoding units 104 and 204. The time required for transmitting one screen image can be grasped from the frame rate.

The coding and decoding unit 104 or 204 serves to obtain the corresponding frame rate in the internal process of processing the signal. Hence, $t_{a1}$ and $t_{a2}$ are transmitted as known values to the control units of the camera devices 105 and 205.

Next, the coded video signal is transmitted through the public network 300. When the signal is put on the network 300, the signal is delayed by a certain delay time $t_b$ by the distributors 301 and 302. The value of $t_b$ is known.

Assuming that the overall delay time from the imaging operation done by the camera device 205 to the displaying operation done on the display unit 106 is $t_c$, $t_c$ is calculated as $t_c = t_{a2} + t_b + t_{a1}$. The value of $t_c$ is obtained as a known value. For performing the stopping control to be discussed below, the delay time $t_c$ is transmitted to the communication control devices 107 and 207 and then are stored therein.

Figure 11:
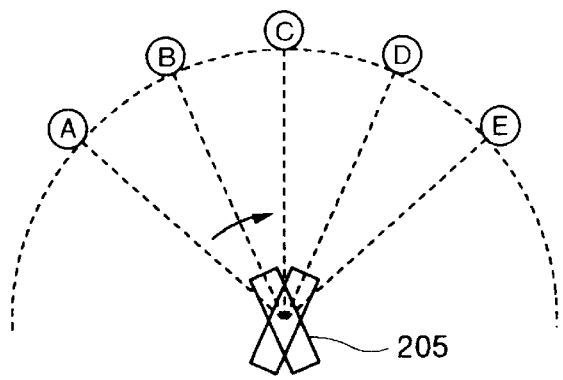
FIG. 11 is a view showing a rotating angle of the camera device.
Figure 12:
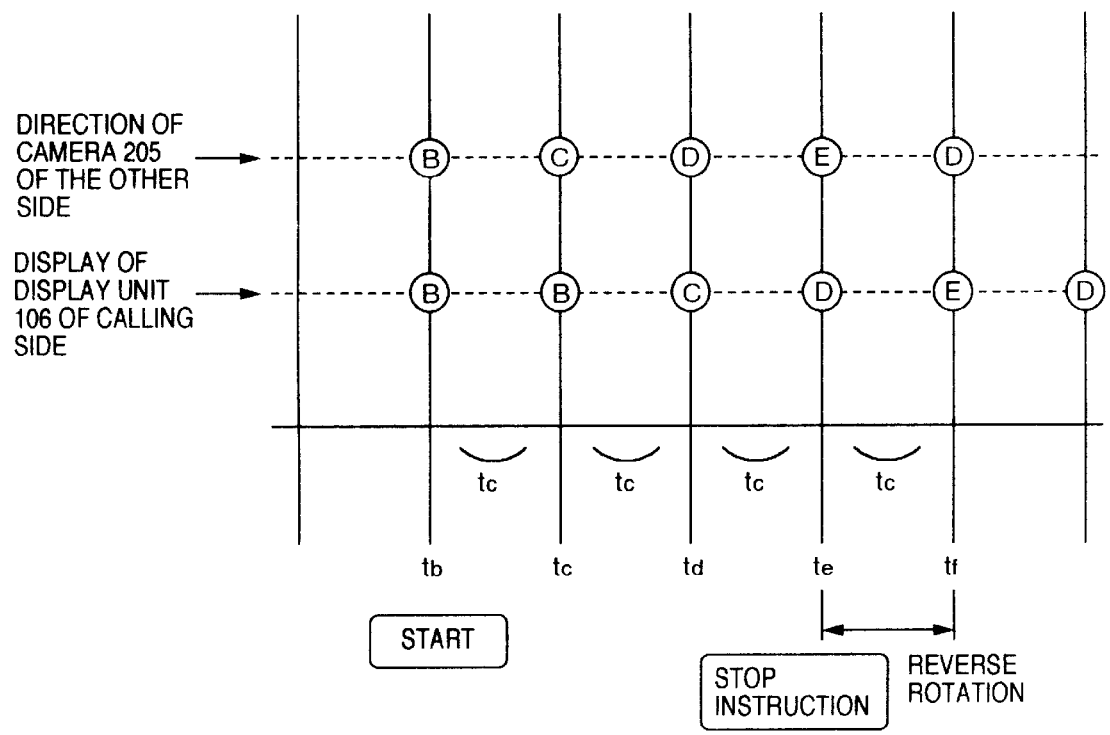
FIG. 12 is a view showing a relation between a displayed image on the calling side and a picked image on the other side.

By using the communication system having the delay time $t_c$ as described above, the camera 205 of the other side is controlled to be stopped. FIG. 11 is a view showing a rotating angle of the camera device. FIG. 12 is a view showing a relation between the displayed image of the calling side and the picked image of the other side.

In FIG. 11, the point B is the current location of the camera device 205 of the other side. It is assumed that the camera is moved round to the point D and stopped there by operating the input unit 103 of the calling side as monitoring an image on the display unit 106 of the calling side.

In FIG. 12, the image picked by the camera device 205 of the other side is delayed by the foregoing delay time $t_c$ when the image is displayed on the display unit 106 of the calling side. Hence, when the camera is stopped at the point D of the display unit 106 of the calling side, the operating signal is immediately transmitted as a control signal to the communication control device 107 and the camera device 205 of the called side through the public network 300. In response to the signal, the camera device 205 of the other side is stopped.

However, since the camera device 205 of the other side is moved round to the point E, after the passage of the delay time $t_c$, the image of E appears on the display unit 106 of the calling side.

The delay time $t_c$ can be grasped from the public network and the frame rate. To solve the delay, hence, the camera device 205 of the other side is reveresely moved by a rotating angle corresponding to the delay time $t_c$.

Figure 13:
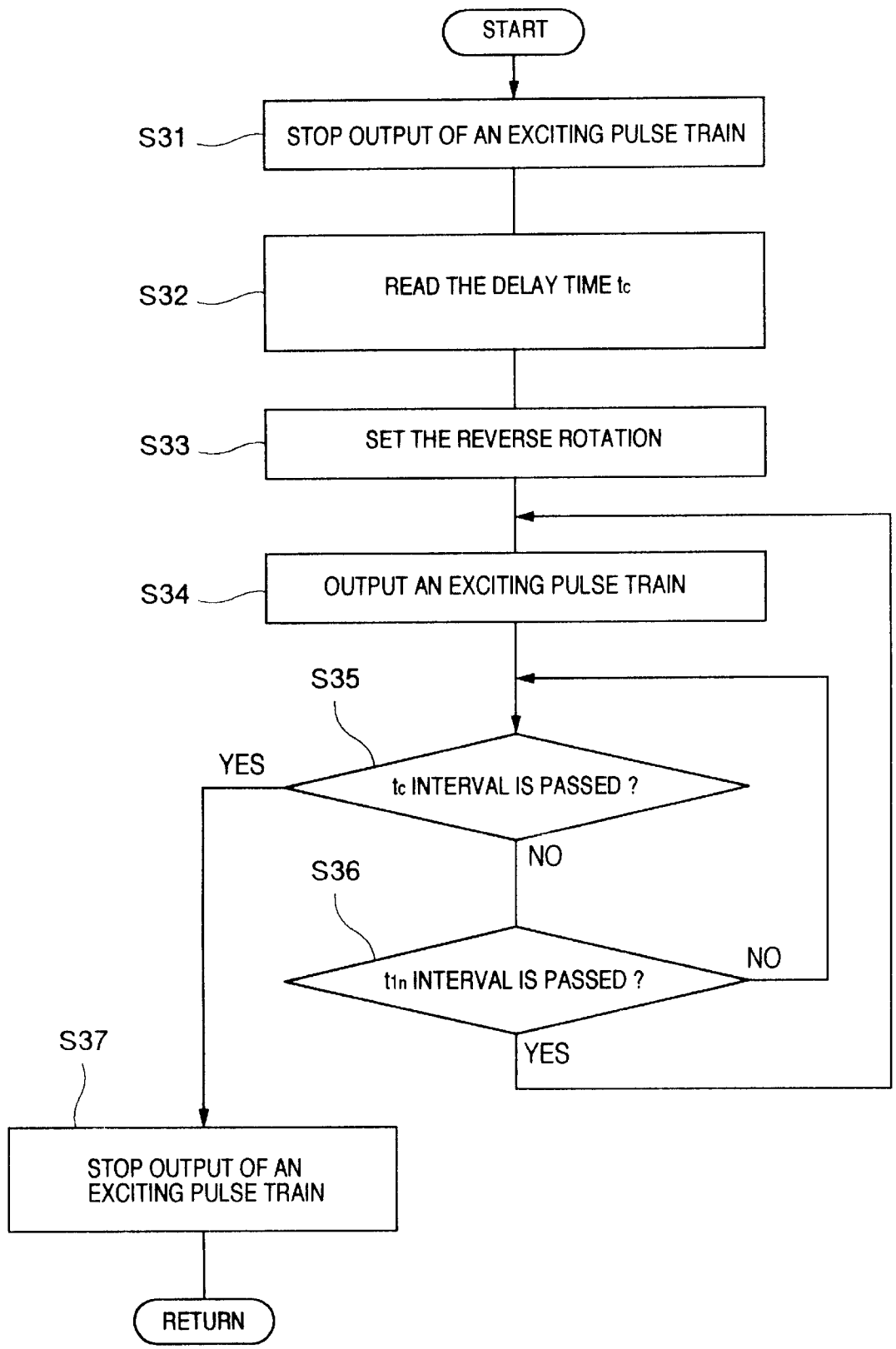
FIG. 13 is a flowchart showing a subroutine for stopping a camera provided on the calling side by instruction of the other side.

FIG. 13 shows a subroutine for stopping the camera of the other side, which is executed at the step 8 of FIG. 3. In FIG. 13, at first, the operation is executed to stop the exciting pulse train being currently outputted (S31). Like the above stopping subroutine, the camera device 205 may be gradually slowed down for absorbing the inertia of the camera device 205.

Next, the delay time $t_c$ is read out of the communication control device 207 (S32). The exciting pulse train is reset so that the rotation of the camera device is reverse to the rotation done at the start time (S33).

Then, the exciting pulse train for reverse rotation is outputted to the first pulse motor 17 (S34) and the passage of the cycle $t_c$ is monitored (S35). If the interval $t_c$ is passed, that is, yes, the operation goes to a step 37.

Whether no, it is monitored whether the cycle of $t_{1n}$ is passed at a step 36. If no, the operation returns to the step 35. If yes, the operation returns to the step 34, at which the exciting pulse train for reverse rotation is outputted at a cycle of $t_{1n}$ (that is, the cycle used when the motor is driven at the step 33 of FIG. 7).

On the other hand, if 35 indicates yes, the reverse rotating interval is finished and the output of the exciting pulse train is immediately stopped (S37). Similarly to the above case, the exciting pulse train may be gradually reduced to zero.

Hence, as shown in FIG. 12, the foregoing operation does not need an operator to do such a fine adjusting operation as returning the camera to the point D after the operator viewed the point E on the display unit 106. This makes great contribution to improving the operativity of the camera device.

Further, this embodiment has been described with reference to the tilting operation. For the panning operation, it goes without saying that the similar operation is made possible only if the same control is executed for the second pulse motor 18.

As set forth above, the camera remote-control device according to the present invention operates to selectively output a long-cycle pulse train or a short-cycle pulse train under the control of the control means for each side. If the camera of the calling side is panned or tilted by operating the communication device of the other side, the long-cycle pulse train is issued. If the camera of the calling side is panned or tilted by operating the communication device of the same side, the short-cycle pulse train is issued.

This, therefore, makes it possible to reduce a time lag between the screen on the display unit and the actual operation, the time lag corresponding to the delay time. The reduced time lag allows an operator to operate the camera device without concern.

When the panning or tilting of the camera device is started, the start control means operates to output a long-cycle pulse train at the initial interval. The long-cycle pulse train is suitable to fine adjustment of the location of an object on the display. After the initial interval, the cycle of the output pulse train is gradually made shorter. Then, after a certain interval is passed, the short-period pulse train is outputted. The short cycle pulse train is suitable to rough adjustment of the location of an object. This pulse adjustment makes it possible to quickly and accurately locate the camera to the target object.

If the panning or tilting of the camera device of the calling side is stopped by operating the communication device of the other side, the stop control means operates to output a pulse for panning or tilting the camera reversely to the above start pulse train. The output of this pulse train is kept for a constant period. Hence, the camera remote-control device according to this invention enables automatic correction of the time lag and stopping the camera nearby the target object. This device is superior in workability, operativity and reliability.

What is claimed is:

1. A method of remote-controlling a direction of imaging means by using a remote-control means which rotatively support said imaging means and are connected to a communication line, said remote-control means comprising a plurality of remote-control devices associated with each other through said communication line, said method comprising the steps of:

(a) employing said imaging means to pick up an image and generate and output image information to said remote-control means;

(b) inputting instruction information about an operating instruction to said remote-control means;

(c) controlling a communicating operation of said remote-control means, said communicating operation comprising transmitting/receiving, through said communication line, at least one of (i) said image information generated in step (a) and (ii) said instruction information obtained in step (b);

(d) displaying, on display means of said remote-control means, at least one of said image information generated in step (a) and said image information received through said communication line in step (c); and (e) rotating said imaging means in accordance with the instruction information obtained in step (b) at a first speed and rotating said imaging means in accordance with the instruction information received in step (c) at a second speed which is different from said first speed.

2. A method according to claim 1, wherein said first speed is faster than said second speed.

3. A method of remote-controlling a direction of imaging means by using a remote-control device which rotatively supports said imaging means and is connected to a communication line, said method comprising the steps of:
- (a) employing said imaging means to pick up an image and generate image information at at least a first side and a second side and output said image information to said remote-control device;
- (b) inputting instruction information about an operating instruction to said remote-control device at said first side and said second side;
- (c) controlling a communicating operation of said remote-control device, said communicating operation comprising transmitting/receiving, between said first side and said second side through said communication line, at least one of (i) said image information generated in step (a) and (ii) said instruction information obtained in step (b);
- (d) displaying, on display means of said remote-control device at said first side, at least one of said image information generated at said first side and said image information received from said second side through said communication line; and
- (e) rotating said imaging means at the first side in accordance with the instruction information obtained from the first side at a first speed and rotating said imaging means at the first side in accordance with the instruction information obtained from the second side at a second speed which is different from said first speed.

4. A method according to claim 3, wherein said first speed is faster than said second speed.

5. A remote-control device for rotatively supporting imaging means, which picks up an image and generates image information, and remote-controlling a direction of said imaging means, said remote-control device comprising:
- input means for inputting instruction information about an operating instruction for said remote-control device;
- communication means for controlling connection and disconnection of a communication line between at least a first side and a second side and for transmitting/receiving, through said communication line, at least one of (i) said image information generated by said imaging means and (ii) said instruction information obtained by said input means;
- display means, connected to said communication means, for displaying at least one of said image information generated by said imaging means and said image information received by said communication means;
- driving means for driving said imaging means to rotate at least one of horizontally and vertically; and
- control means, connected to said input means and said communication means, for outputting a driving signal for driving said driving means in accordance with said instruction information, said control means outputting different driving signals depending on whether the instruction information is input at the first side or the second side so that said driving means rotates said imaging means at the first side in accordance with the instruction information input at the first side at a first speed and rotates said imaging means at the second side in accordance with the instruction information input at the first side at a second speed which is different from said first speed.

6. A remote-control device according to claim 5, wherein said first speed is faster than said second speed.

7. A remote-control device according to claim 6, wherein:
- the driving signal output from said control means is an exciting pulse train for driving a motor included in said driving means for a rotating operation; and
- when said imaging means is rotated at the first side in accordance with the instruction information input at the second side, a cycle of said exciting pulse train is longer than that when said imaging means is rotated at the first side in accordance with the instruction information input at the first side.

* * * * *